(12) United States Patent
Buckus (10) Patent No.: US 7,765,703 B2
(45) Date of Patent: Aug. 3, 2010

(54) CENTERING MANDREL

(75) Inventor: Gary Mark Buckus, Bothell, WA (US)

(73) Assignee: The Boeing Company, Chicago, IL (US)

( * ) Notice: Subject to any disclaimer, the term of this patent is extended or adjusted under 35 U.S.C. 154(b) by 461 days.

(21) Appl. No.: 11/836,328

(22) Filed: Aug. 9, 2007

(65) Prior Publication Data
US 2009/0039198 A1 Feb. 12, 2009

(51) Int. Cl.
*G01C 15/00* (2006.01)
*G01D 21/00* (2006.01)

(52) U.S. Cl. .............................. 33/286; 33/333; 33/613; 33/645

(58) Field of Classification Search ........... 33/282–283, 33/286, 333–334, 339, 343, 369–371, 374–375, 33/304, 308, 313, 520, 544, 613, 644–645, 33/DIG. 21; 29/466; 42/134
See application file for complete search history.

(56) References Cited

U.S. PATENT DOCUMENTS

| | | | | |
|---|---|---|---|---|
| 4,871,492 A * | 10/1989 | Spoetzl | .......................... | 264/39 |
| 5,048,384 A * | 9/1991 | Carlen | .......................... | 82/170 |
| 5,364,253 A * | 11/1994 | Kojima et al. | ................. | 425/78 |
| 6,823,598 B1 * | 11/2004 | Loescher | ....................... | 33/286 |
| 7,665,218 B1 * | 2/2010 | Pinto | ............................ | 33/333 |
| 2004/0187658 A1 * | 9/2004 | Moruzzi | ....................... | 82/123 |
| 2005/0110224 A1 * | 5/2005 | Launius, Jr. | ..................... | 279/8 |

* cited by examiner

*Primary Examiner*—Yaritza Guadalupe-McCall
(74) *Attorney, Agent, or Firm*—Yee & Associates, P.C.; Dennis R. Plank (57) ABSTRACT

A method and apparatus for aligning structures. In one advantageous embodiment, an apparatus comprises a tapered member and a plurality of segments. The tapered member has a first end and a second end, a diameter that increases from the first end to the second end, and the diameter has a first center. The each of the plurality of segments has an inner surface and an outer surface, wherein the plurality of segments define a tapered channel capable of receiving the tapered member, wherein the outer surface has an outer diameter with a second center corresponding to the first center, and wherein movement of the plurality of segments to the second end increases the outer diameter with the second center remaining in around a same location.

14 Claims, 7 Drawing Sheets

CENTERING MANDREL

BACKGROUND INFORMATION

1. Field

The present disclosure relates generally to manufacturing and in particular to a method and apparatus for manufacturing products. Still more particularly, the present disclosure relates to a method and apparatus for aligning components for assembly in manufacturing products.

2. Background

Manufacturing involves using tools and a processing medium for transforming raw materials into finished goods. With respect to the manufacturing of aircraft, components and structures, such as engines, fuselages, wings, hydraulics, and electronic systems are produced and assembled to form an aircraft. A flap is a component that is installed onto the wing when assembling the wing of an aircraft. A flap is a hinged surface on the trailing, leading edge of the wing of a fixed wing aircraft, which may be used to change the coefficient and drag of the wing.

When installing a flap onto a wing, the flap is installed onto support structures. These support structures may have mounting points with channels or bushings in which portions of the flap are placed to hold the flap in place in the wing and to allow the flap to rotate. These mounting points for a flap are manufactured such that the installation points are aligned with each other. In some cases, adjustments may be made to the alignment during installation of the flaps.

Depending on the particular design and specifications, the tolerance in alignment between the center points of each mounting point for a flap may be very small. For example, $5/1000$ths of an inch tolerance may be required between the two mounting points. Alignment of these mounting points may be challenging because of the distance between these points. A distance of twenty feet between the mounting points is not uncommon.

Tools currently used for aligning components include, for example, a laser system. A laser transmitter may be placed at one mounting point and a laser receiver may be placed at the other mounting point. The readout from the laser receiver may indicate the alignment between center points of the two mounting points for the flap. With currently available tools, mounting the laser system at the mounting points may be challenging and typically require two or more persons to setup and perform the alignment procedure.

SUMMARY

The different advantageous embodiments provide a method and apparatus for aligning structures. In one advantageous embodiment, an apparatus comprises a tapered member and a plurality of segments. The tapered member has a first end and a second end, a diameter that increases from the first end to the second end, and the diameter has a first center. Each of the plurality of segments has an inner surface and an outer surface, wherein the plurality of segments define a tapered channel capable of receiving the tapered member, wherein the outer surface has an outer diameter with a second center corresponding to the first center, and wherein movement of the plurality of segments to the second end increases the outer diameter with the second center remaining in around a same location.

In another advantageous embodiment, a centering mandrel comprises a tapered shaft, a plurality of expansion segments, a coupling system, a bearing system coupled to the tapered shaft, and an alignment device attached to the second end of the tapered shaft. The tapered shaft has a first end and a second end, the tapered shaft has a first diameter that increases from the first end to the second end, and wherein the first diameter has a first center. Each of the plurality of expansion segments has an outer surface and an inner surface in which the inner surface has a tapered groove and wherein the inner surfaces of the plurality of expansion segments define a tapered channel capable of receiving the tapered shaft and wherein outer surfaces of the plurality of expansion segments define an outer diameter having a second center corresponding to the first center. The coupling system is capable of holding the plurality of expansion segments around the tapered shaft. Manipulation of the bearing system moves the plurality of expansion segments in a direction towards the second end of the tapered shaft and wherein movement of the plurality of expansion segments towards the second end causes the outer diameter of the plurality of expansion segments to increase while the second center is the around a same location.

In yet a different advantageous embodiment, a method is used to install a structure between a first mounting point and a second mounting point. A centering mandrel with a laser positioning unit is placed into a channel in the first mounting point for the structure. The positioning unit may be, for example, a laser sensor or transmitter. The centering mandrel is locked in the channel in the first mounting point, wherein the centering mandrel has a first center and the channel has a second center aligned with the first center. The first mounting point and the second mounting point are aligned with the laser positioning system. The structure is coupled to the first mounting point and the second mounting point after the first mounting point and the second mounting point have been aligned.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
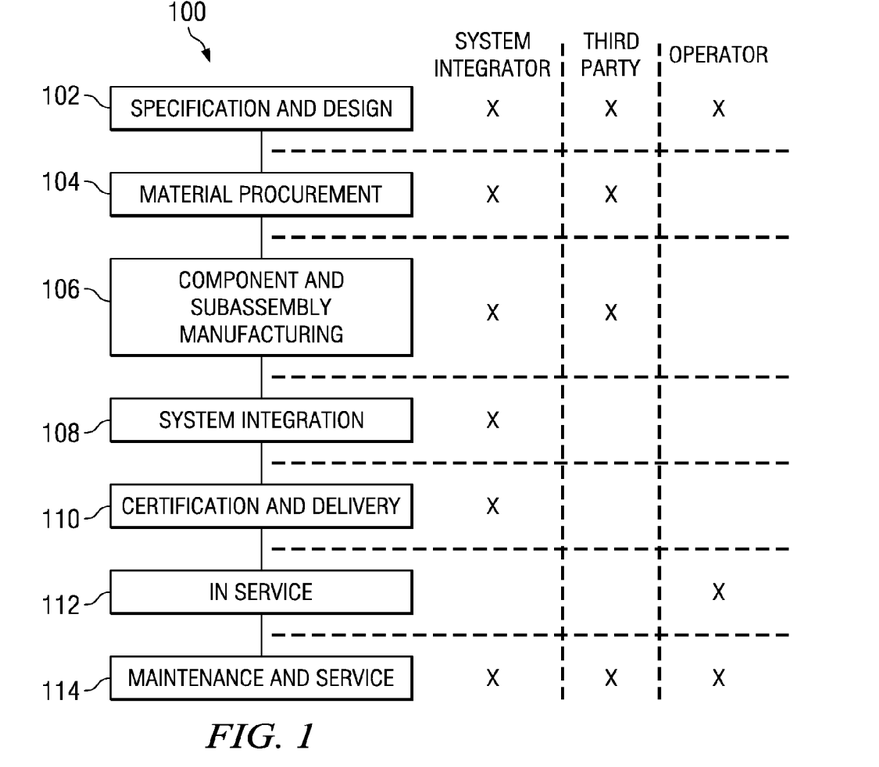
FIG. 1 is a diagram illustrating an aircraft manufacturing and service method in which an advantageous embodiment may be implemented.
Figure 2:
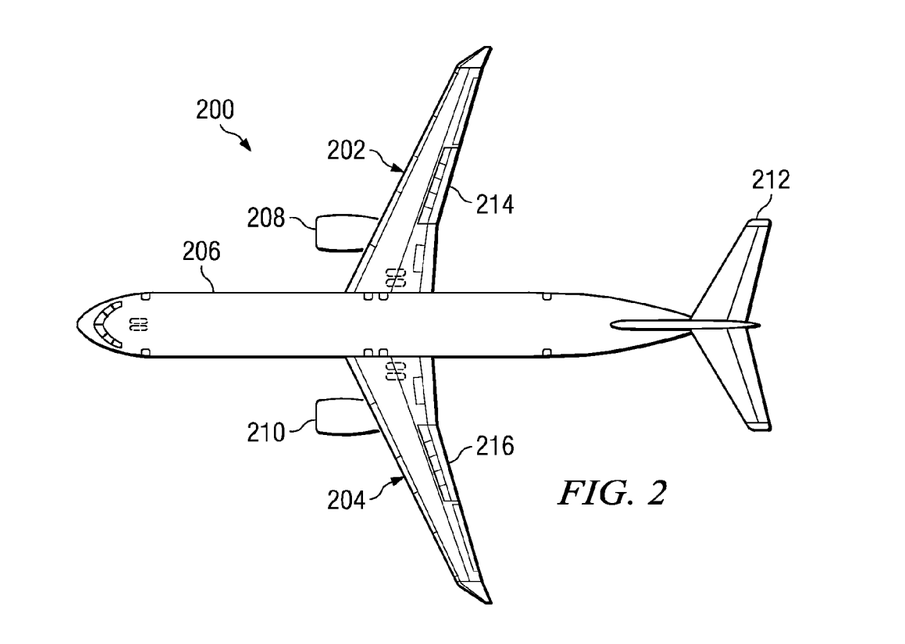
FIG. 2 is a diagram of an aircraft in accordance with an advantageous embodiment.

Referring more particularly to the drawings, embodiments of the disclosure may be described in the context of the aircraft manufacturing and service method as shown in FIG. 1 and the aircraft as shown in FIG. 2. Turning first to FIG. 1, a diagram illustrating an aircraft manufacturing and service method is depicted in accordance with an advantageous embodiment. During pre-production, aircraft manufacturing and service method 100 may include specification and design 102 of aircraft 200 in FIG. 2 and material procurement 104. During production, component and sub-assembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator as indicated by the "X" in the grid to the right of the flow diagram of FIG. 1. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 has wings 202 and 204 attached to body 206. Aircraft 200 includes wing mounted engine 208, wing mounted engine 210, and tail 212. Aircraft 200 also includes flaps 214 and 216. Aircraft 200 is produced by aircraft manufacturing and service method 100.

Apparatus and methods embodied herein may be employed during any one or more of the stages of production and aircraft manufacturing and service method 100 in FIG. 1. For example, components or sub-assemblies corresponding to component and sub-assembly manufacturing 106 may be fabricated or manufactured in a manner similar to components or subassemblies produced while aircraft 200 is in service. Also, one or more apparatus embodiments, method embodiments, or a combination thereof may be utilized during production stages for component and sub-assembly manufacturing 106 and system integration 108 in FIG. 1, for example, by substantially expediting assembly of or reducing the cost of aircraft 200. Similarly, one or more of apparatus embodiments, method embodiments, or a combination thereof may be utilized while installing components, such as flaps 214 and 216 on aircraft 200, which may occur during one of component and sub-assembly manufacturing 106 and system integration 108 of aircraft 200 in FIG. 2.

The different advantageous embodiments recognize that aligning, mounting points for components, such as a flap or a wing, may be difficult using current alignment devices. For example, an alignment device may be located on the end of a cylinder that is manufactured to fit within a channel or bearing at a mounting point. A laser transmitter may be mounted to a cylinder that is placed into the channel at one mounting point. The laser may transmit a laser beam that is detected by a sensor located at the other mounting point. Movement or adjustment of one or more mounting points, depending on which mounting point is adjustable, may be used to align the mounting points using the laser transmitter and sensor. One difficulty that occurs is that the size of the channel or bushing in the mounting point may vary depending on the tolerances for those attachment points. As a result, the laser transmitter attached to a cylinder placed into a channel or bearing in a mounting point or location may not be at the center point of the channel or bearing. Consequently, the alignment with the other mounting point may be off or incorrect.

The different advantageous embodiments recognize that one solution may involve manufacturing cylinders of various sizes in attaching the laser transmitter to the cylinder of the appropriate size that fits into the channel with a correct center point or center line. This type of solution, however, results in having multiple tools and having to manufacture tools when new sizes of channels are encountered.

Thus, the different advantageous embodiments provide an apparatus in the form of a centering mandrel that has a tapered shaft in which the tapered shaft has a first end and a second end. The tapered shaft has a first diameter that increases from the first end to the second end of the tapered shaft. The first diameter has a first center. The centering mandrel also has tapered expansion segments in which each of the tapered expansion segments have an outer surface and an inner surface. The inner surface has a tapered groove and the inner surfaces of the tapered expansion segments define a tapered channel capable of receiving the tapered shaft. The outer surfaces of the tapered expansion segments define an outer diameter having a second center corresponding to the first center. A coupling system is used, in which the coupling system is capable of holding the tapered expansion segments around the tapered shaft. This coupling system may be, for example, without limitation, one or more coupling springs. Also, the centering mandrel includes a bearing system coupled to the tapered shaft.

Manipulation of the bearing system moves the tapered expansion segments in the direction towards the second end of the tapered shaft. Movement of the tapered expansion segments toward this second end causes the outer diameter of the tapered expansion segments to increase while the second center is around a same location. The centering mandrel is considered locked in place in these examples when the expansion segments expand in diameter to fit within the channel. When the centering mandrel is in place in the channel the centering mandrel is aligned or corresponds to a center of the channel, the centering mandrel is in place. Further, in these examples the centering mandrel includes an alignment device attached to the second end of the tapered shaft.

Figure 3:
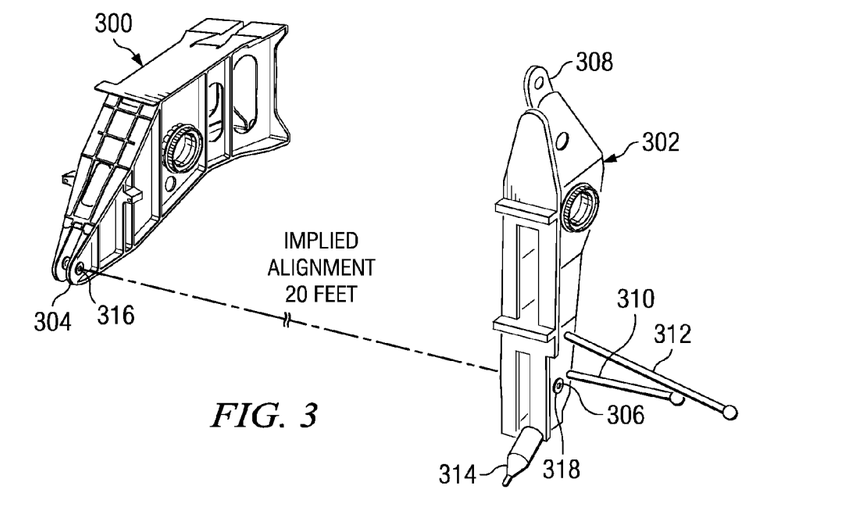
FIG. 3 is a diagram illustrating mounting structures for a flap in accordance with an advantageous embodiment.

Turning now to FIG. 3, a diagram illustrating mounting structures for a flap is depicted in accordance with an advantageous embodiment. In this example, structures 300 and 302 include mounting points 304 and 306. Mounting points 304 and 306 are points at which a flap is to be mounted. In these illustrative examples, structure 300 is fixed, while structure 302 is moveable about pivot point 308. Adjustments to the position of structure 302 may be made to align mounting point 304 with mounting point 306 in these examples. The adjustments are made through adjustment turnbuckles 310, 312, and 314 in these examples.

In the illustrated example, a centering mandrel with an alignment device may be placed into channel 316 at mounting point 304. In these examples, channel 316 is a bushing in which a portion of the flap may be placed. In these examples, the centering mandrel includes a laser sensor. Another centering mandrel may be placed into channel 318 in mounting point 306.

In this advantageous embodiment, the laser transmitter is mounted on a centering mandrel similar to the one placed into channel 316. The laser transmitter sends a beam from channel 318 towards the laser sensor mounted in channel 316. This type of alignment process is especially useful as the alignment distances increase. In this example, the distance between mounting point 304 and mounting point 306 is around twenty feet.

Figure 4:
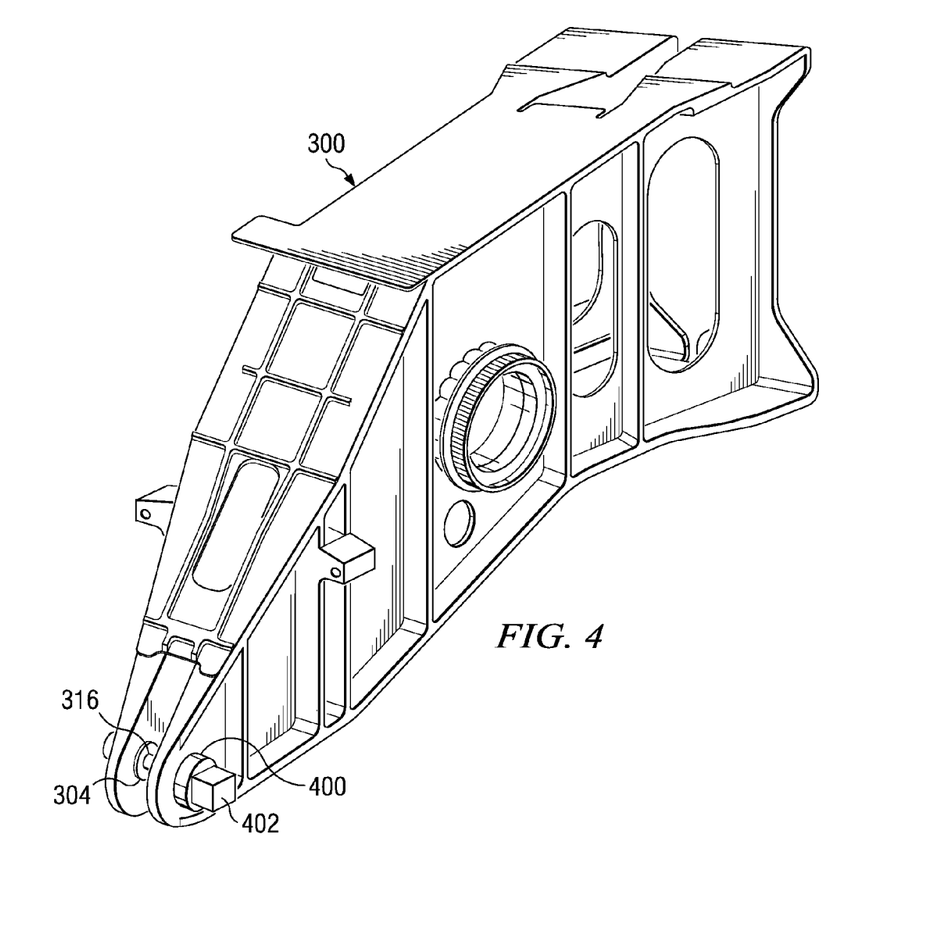
FIG. 4 is a diagram illustrating a mounting structure with a centering mandrel in accordance with an advantageous embodiment.

With reference now to FIG. 4, a diagram illustrating a mounting structure with a centering mandrel is depicted in accordance with an advantageous embodiment. In this example, centering mandrel 400 has been inserted into channel 316 at mounting point 304 in structure 300. A two-dimensional laser sensor 402 is attached to centering mandrel 400 and may receive a light beam from a laser transmitter that is attached to mounting point 306 in structure 302 in FIG. 3.

In these examples, only one centering mandrel is needed. If channel 318 in structure 302 in FIG. 3 has a variance in size that makes placing a laser transmitter difficult, another centering mandrel, such as centering mandrel 400 may be used with a laser attached to it.

Figure 5:
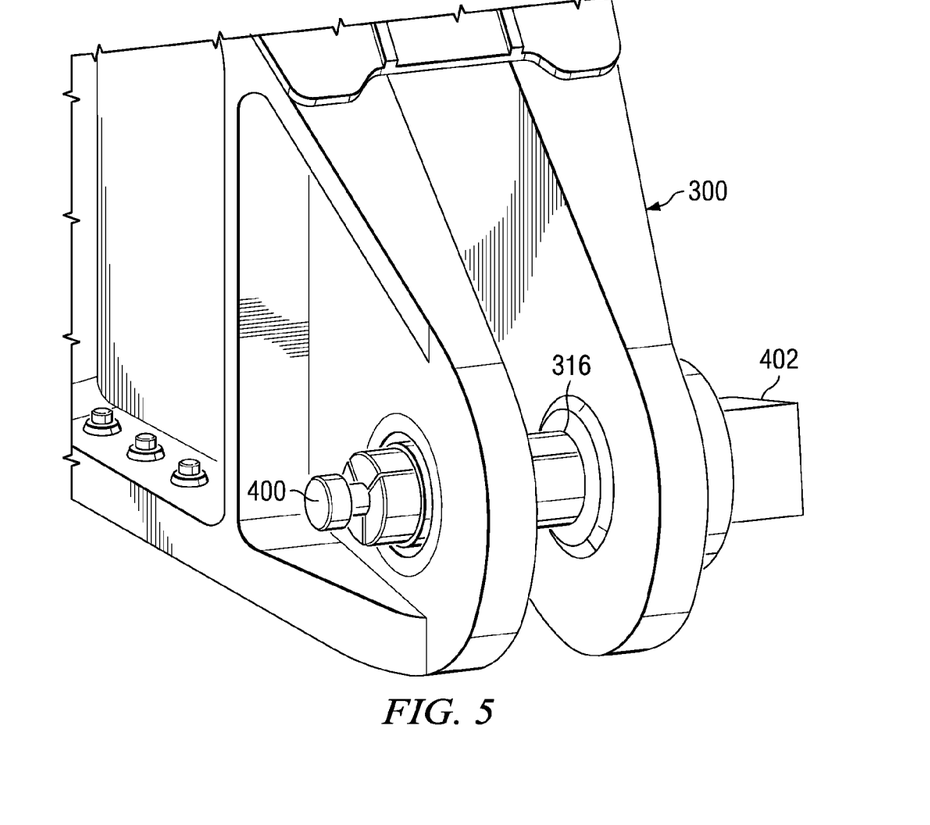
FIG. 5 is another view of a centering mandrel in a mounting structure in accordance with an advantageous embodiment.

Turning now to FIG. 5, another view of a centering mandrel in a mounting structure is depicted in accordance with an advantageous embodiment. As can be seen, centering mandrel 400 is adjusted in a manner that allows for centering mandrel 400 to be positioned within channel 316 with a correct center point. The mechanism for providing an accurate center point within channel 316 is described in more detail below.

Figure 6:
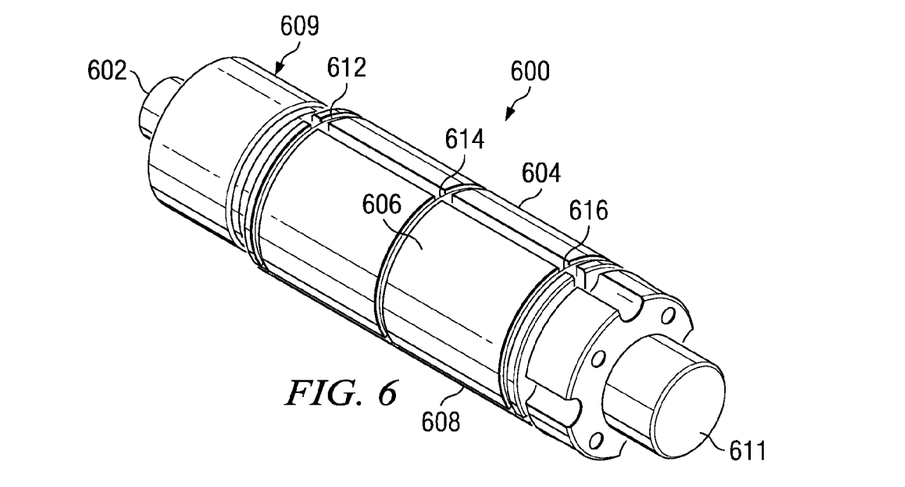
FIG. 6 is a diagram of a centering mandrel in accordance with an advantageous embodiment.

Turning now to FIG. 6, a diagram of a centering mandrel is depicted in accordance with an advantageous embodiment. Centering mandrel 600 is an example of a centering mandrel that may be used within channels 316 and 318 in FIG. 3 to perform alignment of mounting points 304 and 306. In this example, centering mandrel 600 includes tapered arbor 602 and segments 604, 606, and 608. In these examples, these segments are expanding segments that may change in diameter. Centering mandrel 600 also includes bearing system 609.

Bearing system 609 may be manipulated to move expanding segments 604, 606, and 608 towards end 611 of tapered arbor 602. By moving expanding segments 604, 606 and 608 towards end 611, a diameter of these expanding segments is increased. Expansion of these segments while centering mandrel 600 is located in a channel, such as channel 316 in FIG. 3, causes centering mandrel 600 to be "locked" in place with the center of axis of the centering mandrel remaining centered within the channel.

Expanding segments 604, 606, and 608 are held in place around tapered arbor 602 using a coupling system. In these examples, the coupling system takes the form of springs 612, 614, and 616. In these examples, springs 612, 614, and 616 are garter springs, which are similar to a typical wire wound spring, but react in tension or a pulling force towards itself. A garter spring is designed to fit into itself end-to-end, by having one end that is necked down that is designed to fit once wrapped around and hold that ring shaped orientation. Of course, other types of coupling mechanisms may be used. For example, other springs that may be used instead of garter springs are specifically sized rubber O-rings. In other embodiments, the individual segments may be captured mechanically on both ends requiring a complicated internal spring mechanism.

The types of materials used for the different components may differ depending on the mandrels intended purpose. In these examples, tapered shaft in tapered arbor 602 and segments 604, 606, and 608 are made from stainless steel. The remaining components are made from aluminum. Segments 604, 606, and 608 could be made from aluminum as well Turning now to FIG. 7, an exploded view of a centering mandrel is depicted in accordance with an advantageous embodiment. In this example, centering mandrel 600 is shown in an isometric exploded view. Tapered arbor 602 contains tapered member 702 and mounting plate 704. As illustrated, tapered arbor 602 has end 708, which is opposite to end 611. The diameter of tapered arbor 602 increases as tapered member 702 extends from end 708 to end 706.

Figure 7:
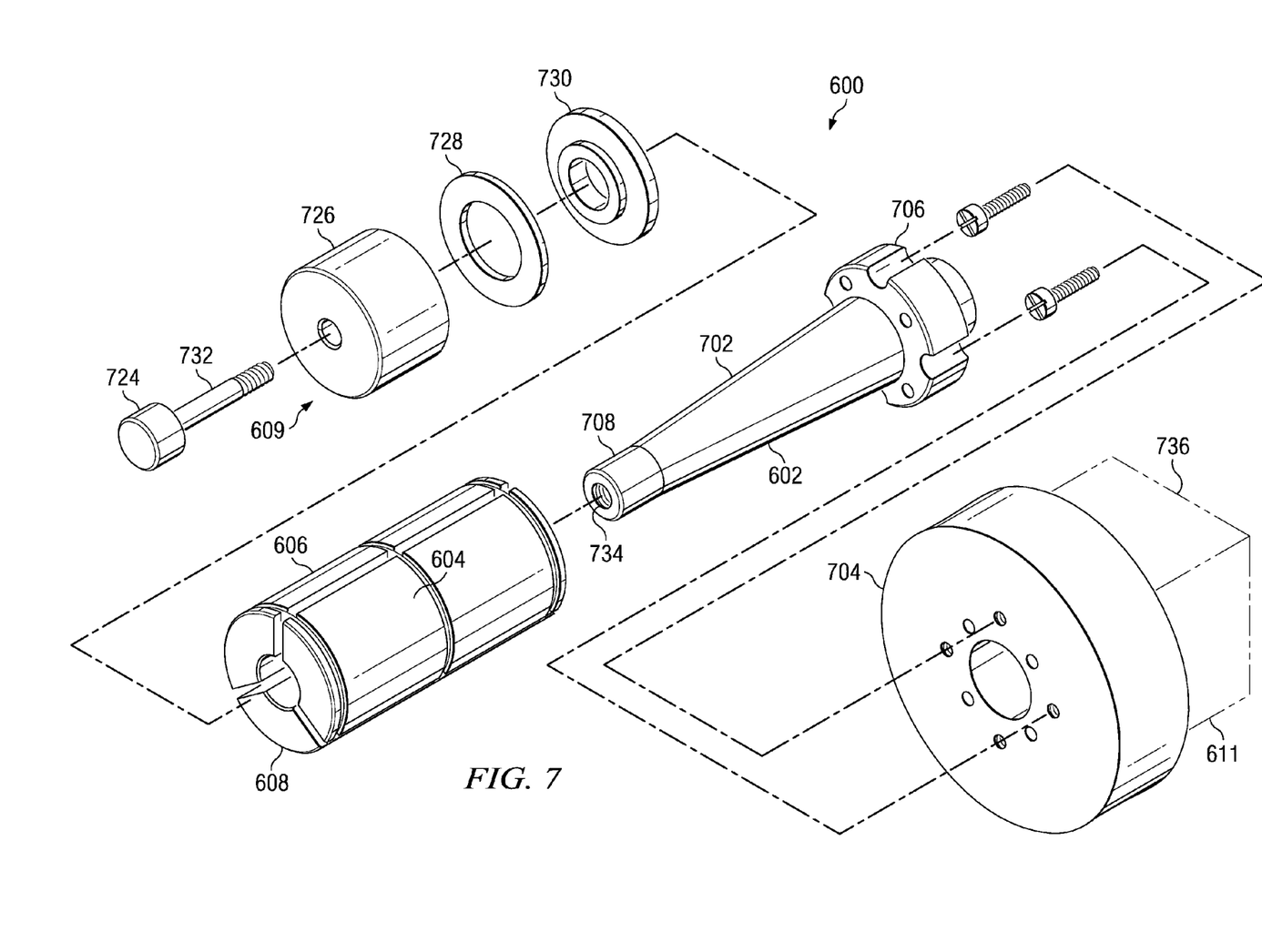
FIG. 7 is an exploded view of a centering mandrel in accordance with an advantageous embodiment.

In this example, tapered member 702 is a cylindrical member in which a diameter of the cylindrical member decreases in size from one end to the other end. End 706 of tapered member 702 is mounted to mounting plate 704. In these examples, tapered member 602 is mounted to mounting plate 704 using screws.

Adjustable torque thumb screw 724, thrust block 726, thrust bearing 728, and thrust washer 730 are components in bearing system 609. In this example, adjustable torque thumb screw 724 has threaded section 732, which may fit into threaded channel 734 in end 708 of tapered member 702.

Additionally, an alignment device, such as laser sensor 736, is attached to end 611 of mounting plate 704 in tapered arbor 602. In these examples, the alignment device may be a laser transmitter or a laser sensor depending on the particular implementation.

Figure 8:
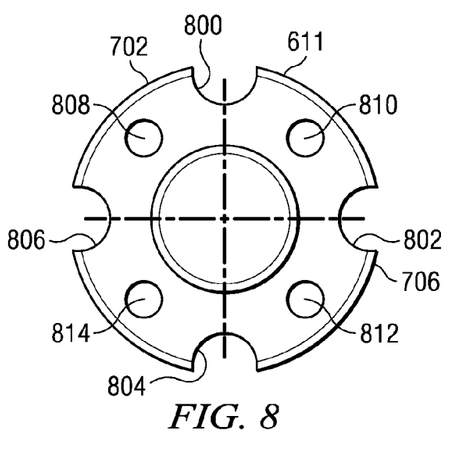
FIG. 8 is a diagram of an end of a tapered member in accordance with an advantageous embodiment.

Turning now to FIG. 8, a diagram of an end of a tapered member is depicted in accordance with an advantageous embodiment. In this example, end 706 in tapered member 702 includes channels 800, 802, 804, and 806. Further, end 706 also includes holes 808, 810, 812, and 814.

Figure 9:
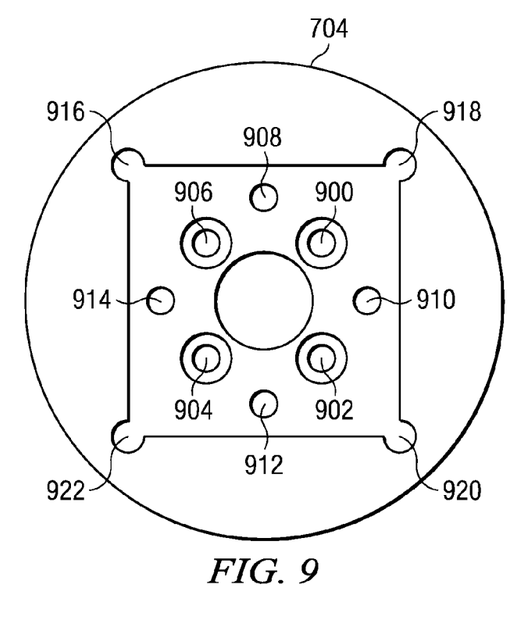
FIG. 9 is a diagram of a top view of a mounting plate in accordance with an advantageous embodiment.

Turning now to FIG. 9, a diagram of a top view of a mounting plate is depicted in accordance with an advantageous embodiment. Mounting plate 704 includes holes 900, 902, 904, and 906. These holes are used to pass screws or some other fastening mechanism through mounting plate 704 into holes 808, 810, 812 and 814 in FIG. 8 as part of a mechanism to attach tapered member 602 to mounting plate 704.

Further, holes 908, 910, 912, and 914 provide holes for which screws passing through channels 800, 802, 804, and 806 may be used to attach laser sensor 736 in FIG. 7 to mounting plate 704. In these examples, blind holes 916, 918, 920, and 922 provide corner clearance for laser sensor 736 when mounting this component to plate 704.

Figure 10:
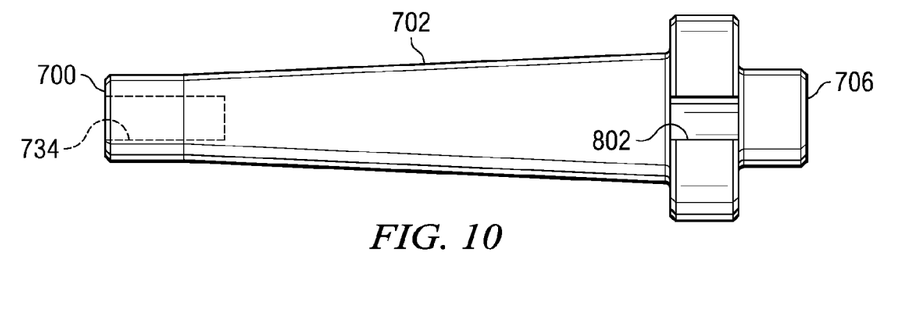
FIG. 10 is a side view of a tapered member in accordance with an advantageous embodiment.

Turning now to FIG. 10, a side view of a tapered member 702 is depicted in accordance with an advantageous embodiment.

Figure 11:
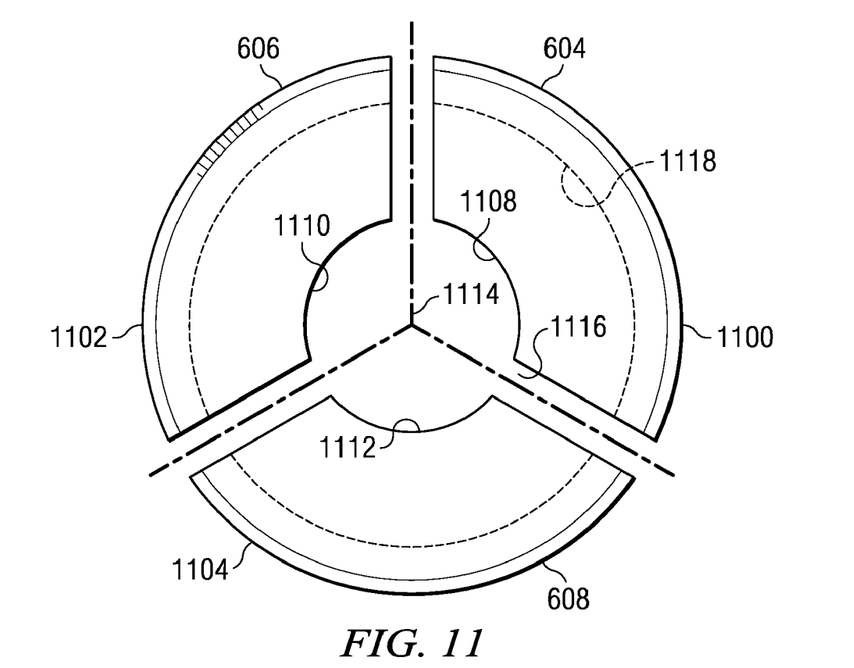
FIG. 11 is a top view of an expanding segment in accordance with an advantageous embodiment.

Turning now to FIG. 11, a top view of an expanding segment is depicted in accordance with an advantageous embodiment. In this example, expanding segments 604, 606, and 608 have outer surfaces 1100, 1102, and 1104. Additionally, these expanding segments have inner surfaces 1108, 1110, and 1112. These inner surfaces are arranged such that channel 1114 is present. Channel 1114 is a tapered channel.

In this depicted example, the arrangement of expanding segments 604, 606, and 608 have a configuration that includes diameter 1116 at one end of these expanded segments and diameter 1118. As can be seen, the diameter decreases in size from one end to the other end of expanding segments 604, 606, and 608 in this arrangement.

Figure 12:
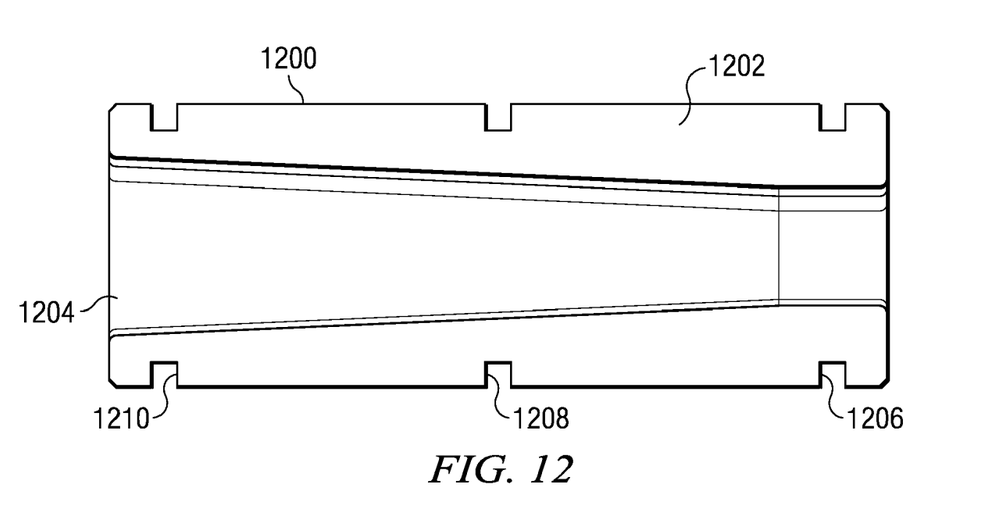
FIG. 12 is a diagram of a cross-sectional view of an expanding segment in accordance with an advantageous embodiment.

With reference next to FIG. 12, a diagram of a cross-sectional view of an expanding segment is depicted in accordance with an advantageous embodiment. In this example, expanding segment 1200 is a cross-sectional view of an expanding segment, such as expanding segment 604, 606 or 608 in FIG. 6. In this example, inner surface 1202 has groove 1204, which forms a tapered channel when a plurality of expanding segments are put together in the configuration depicted in FIG. 11.

Additionally, expanding segment 1200 includes grooves 1206, 1208, and 1210. These grooves are used to provide a place for a coupling mechanism to hold the different segments together around a tapered member. In this particular example, the coupling mechanism takes the form of a spring that is placed into the channels of the expanding segments when placed around tapered arbor 602 in FIG. 6.

Figure 13:
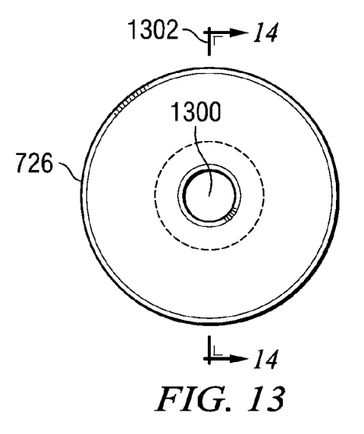
FIG. 13 is a top view of a thrust block in accordance with an advantageous embodiment.

Turning now to FIG. 13, a top view of a thrust block is depicted in accordance with an advantageous embodiment. In this example, thrust block 726 includes hole 1300, which is configured to receive adjustable torque thumb screw 724 in FIG. 7.

Figure 14:
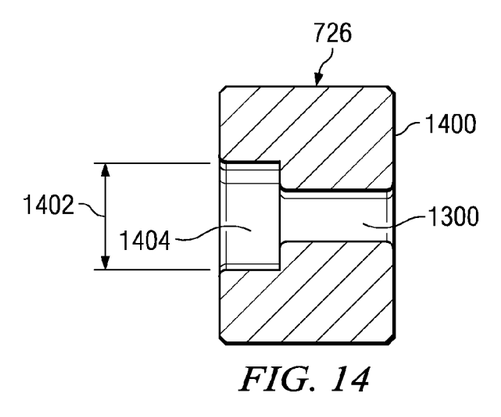
FIG. 14 is a cross-sectional view of thrust block in accordance with an advantageous embodiment.

Turning now to FIG. 14, a cross-sectional view of thrust block 726 is depicted in accordance with an advantageous embodiment. This cross sectional view is taken along lines 1302 in FIG. 13. In this example, hole 1300 has two diameters, diameter 1404 and diameter 1402. The diameter of hole 1300 expands to diameter 1402 to form engagement section 1404. This section engages the straight portion in end 708 of bearing system 609 helping to guide bearing system 609 along the axial centerline, thus contacting one end of expanding segments 604, 606, and 608 to push those segments towards a base of tapered shaft 602 as adjustable torque thumb screw 724 is manipulated to move thrust block 726 towards tapered shaft 602.

Figure 15:
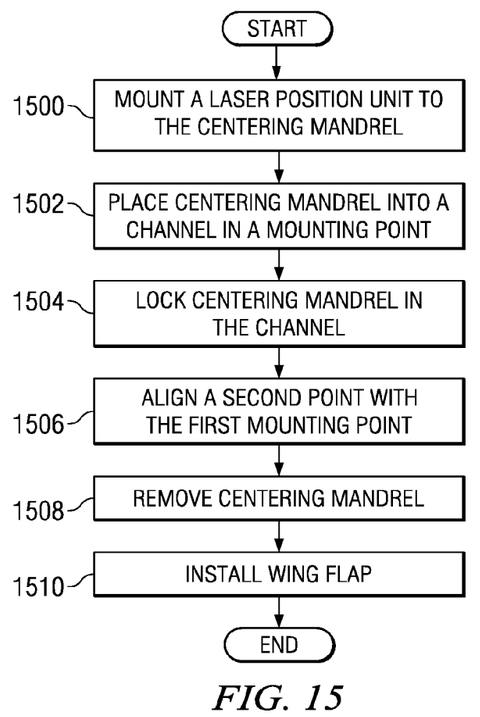
FIG. 15 is a flowchart of a process for installing a wing flap in accordance with an advantageous embodiment.

Turning now to FIG. 15, a flowchart of a process for installing a wing flap is depicted in accordance with an advantageous embodiment. In this example, the process in FIG. 15 may be applied to installing a wing flap, such as wing flap 216 for aircraft 200 in FIG. 2.

The process begins by mounting a laser positioning unit to the centering mandrel (operation 1500). In these examples, the laser positioning unit is a two-dimensional laser sensor that is mounted to one end of the centering mandrel. The centering mandrel is then placed into a channel in a mounting point (operation 1502). In these examples, the channel is a channel, such as channel 316 for mounting point 304 in structure 300 in FIGS. 3 and 4. The centering mandrel is a centering mandrel similar to centering mandrel 400 in FIG. 4.

Thereafter, the centering mandrel is locked into place in the channel (operation 1504). In these examples, the centering mandrel is locked into place within the channel by moving the expandable segments for the centering mandrel such that the diameter for the centering mandrel increases, while the center point of the centering mandrel remains around the same position, such that tolerances for aligning points may be achieved. A second mounting point is aligned with the first mounting point (operation 1506). This alignment is done using the laser beam transmitted from the second mounting point. A laser transmitter may be placed at the second mounting point for use with the sensor to detect when adjustment or movement of the second mounting point is sufficient such that channels in the two mounting points are correctly aligned within acceptable or selected tolerances. In these examples, the alignment of the channels is made with respect to center points in the two channels in the two mounting points.

Next, the centering mandrel is removed (operation 1508). Then the remaining components for the wing flap are installed into the mounting points (operation 1510) with the process terminating thereafter.

Thus, the different advantageous embodiments provide a centering mandrel and a method for aligning mounting points. An apparatus has a tapered member with a first end and a second end in which a diameter increases from the first end to the second end. A plurality of segments each having an inner surface and an outer surface are present in which the segments define a tapered channel capable of receiving the tapered member. Movement of the segments towards one end of the tapered channel increases the outer diameter of the plurality of segments in a manner such that the center point or center remains in or around the same location.

Two mounting points, such as mounting points for a wing flap may be aligned using a centering mandrel, such as the one depicted in the different embodiments. The centering mandrel may be placed into a channel in the first mounting point for the wing flap. The centering mandrel may then be locked within the channel such that the centering mandrel has a center with an axis through the center and the channel has a second axis in which the first axis is around a laser position source which may be mounted to the centering mandrel, and alignment of a second mounting point may be made with the first mounting point using the laser positioning source.

Of course, the different illustrative embodiments may be applied to aligning other types of mounting structures or mounting points other than wing flaps. The different advantageous embodiments may be applied to aligning mounting points for any type of structure. Other structures include, for example, tooling and fixtures in the factory and hinge arrangements, such as cargo doors. Some of the different embodiments are useful when dealing with various sized holes or dimensionally variable holes/channels. The centering mandrel in these examples may be infinitely adjustable within its range of radial motion. Also, design of the centering mandrel is "scalable" and can be modified to fit various configurations.

The description of the different advantageous embodiments has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A centering mandrel comprising:
   a tapered shaft, wherein the tapered shaft has a first end and a second end, the tapered shaft has a first diameter that increases from the first end to the second end, and wherein the first diameter has a first center;
   a plurality of expansion segments, wherein each of the plurality of expansion segments having an outer surface and an inner surface in which the inner surface has a tapered groove, and wherein inner surfaces of the plurality of expansion segments define a tapered channel capable of receiving the tapered shaft, and wherein outer surfaces of the plurality of expansion segments define an outer diameter having a second center corresponding to the first center;

a coupling system capable of holding the plurality of expansion segments around the tapered shaft; and a bearing system coupled to the tapered shaft, wherein manipulation of the bearing system moves the plurality of expansion segments in a direction towards the second end of the tapered shaft, and wherein movement of the plurality of expansion segments towards the second end causes the outer diameter of the plurality of expansion segments to increase, while the second center is around a same location.

2. The centering mandrel of claim 1 further comprising:

an adjustment device attached to the second end of the tapered shaft.

3. The centering mandrel of claim 1, wherein the bearing system comprises:

a thrust block having a first end and a second end with a channel extending from the first end to the second end, wherein the second end is mechanically coupled to one end of the plurality of expansion segments; and an adjustable screw extending through the channel from the first end of the thrust block and into a threaded channel in the first end of the tapered shaft, wherein manipulation of the adjustable screw causes the thrust block to move the plurality of expansion segments towards the second end of the tapered shaft.

4. The centering mandrel of claim 3, wherein the second end of the thrust block is mechanically coupled to the one end of the plurality of expansion segments by a bearing and a washer located between the second end of the thrust block and the one end of the plurality of expansion segments.

5. The centering mandrel of claim 1, wherein the alignment device is selected from one of a laser transmitter and a laser sensor.

6. The centering mandrel of claim 1, wherein the coupling system is a set of coupling springs.

7. An apparatus comprising:

a tapered member having a first end and a second end, a diameter that increases from the first end to the second end, and the diameter having a first center; and a plurality of segments each having an inner surface and an outer surface, wherein the plurality of segments define a tapered channel capable of receiving the tapered member, wherein the outer surface has an outer diameter with a second center corresponding to the first center, and wherein movement of the plurality of segments to the second end increases the outer diameter with the second center remaining in or around a same location.

8. The apparatus of claim 7 further comprising:

a coupling system attached to the plurality of segments capable of holding the plurality of segments in place around the tapered member.

9. The apparatus of claim 8 further comprising:

a bearing system coupled to the tapered member, wherein manipulation of the bearing system moves the plurality of segments in a direction towards the second end of the tapered member.

10. The apparatus of claim 9, wherein the bearing system comprises:

a thrust block having a first end and a second end with a channel extending from the first end to the second end, wherein the second end is mechanically coupled to one end of the plurality of segments; and an adjustable screw extending through the channel from the first end of the thrust block and into a threaded channel in the first end of the tapered member, wherein manipulation of the adjustable screw causes the thrust block to move the plurality of expansion segments towards the second end of the tapered member.

11. The apparatus of claim 10, wherein the second end of the thrust block is mechanically coupled to the one end of the plurality of segments by a bearing and a washer located between the second end of the thrust block and the one end of the plurality of segments.

12. The apparatus of claim 9 further comprising:

an alignment device attached to the second end of the tapered member.

13. The apparatus of claim 12, wherein the alignment device is a laser transmitter.

14. The apparatus of claim 12, wherein the alignment device is a laser sensor.

* * * * *